US012247531B2

(12) United States Patent
Iwamoto

(10) Patent No.: US 12,247,531 B2
(45) Date of Patent: Mar. 11, 2025

(54) CANISTER

(71) Applicant: FUTABA INDUSTRIAL CO., LTD., Okazaki (JP)

(72) Inventor: Koji Iwamoto, Okazaki (JP)

(73) Assignee: FUTABA INDUSTRIAL CO., LTD., Okazaki (JP)

( * ) Notice: Subject to any disclaimer, the term of this patent is extended or adjusted under 35 U.S.C. 154(b) by 0 days.

(21) Appl. No.: 18/741,234

(22) Filed: Jun. 12, 2024

(65) Prior Publication Data

US 2025/0020092 A1 Jan. 16, 2025

(30) Foreign Application Priority Data

Jul. 13, 2023 (JP) ................................ 2023-115103

(51) Int. Cl.
*F02M 25/08* (2006.01)

(52) U.S. Cl.
CPC .... *F02M 25/0854* (2013.01); *F02M 25/0872* (2013.01)

(58) Field of Classification Search
CPC .......... F02M 25/0854; F02M 25/0872; B01D 2253/102; B01D 2253/342; B01D 2253/3425; B01D 2257/702; B01D 2259/4516
See application file for complete search history.

(56) References Cited

U.S. PATENT DOCUMENTS 3,477,210 A * 11/1969 Hervert .............. F02M 25/0854 96/144
4,013,054 A * 3/1977 Balsley .............. F02M 25/0836 123/519
2002/0124732 A1* 9/2002 Hara .................. B01D 53/0446 96/132
2005/0081717 A1* 4/2005 Meiller .............. B01D 53/0446 96/154
2006/0065251 A1* 3/2006 Meiller .............. F02M 25/0854 123/519
2006/0065252 A1* 3/2006 Meiller .............. F02M 25/0854 123/519

(Continued)

FOREIGN PATENT DOCUMENTS

JP 06091166 A * 4/1994
JP 6568328 B1 8/2019
JP 7244553 B1 3/2023

*Primary Examiner* — John M Zaleskas
(74) *Attorney, Agent, or Firm* — Withrow + Terranova, PLLC; Vincent K. Gustafson

(57) ABSTRACT

A canister includes at least one chamber in which an adsorbent to adsorb fuel vapor is arranged, an inflow port, an atmosphere port, an outflow port, and an adsorbent agglomerate. The adsorbent agglomerate is arranged in a specific chamber. The adsorbent agglomerate is a mass of a fibrous adsorbent. The specific chamber is one of the at least one chamber. The adsorbent agglomerate includes, on its outer surface, first and second surfaces intersecting with a flow direction of a fluid, and the second surface is positioned on a side opposite to the first surface. The adsorbent agglomerate includes at least one vacant space formed in the first surface and/or the second surface, and the at least one vacant space extends along the flow direction to a bottom located inside the adsorbent agglomerate.

12 Claims, 6 Drawing Sheets

(56) References Cited

U.S. PATENT DOCUMENTS

2006/0142154 A1* 6/2006 Wolff .................... C01B 32/382 264/211
2007/0113831 A1* 5/2007 Hoke ................. F02M 25/0854 123/519
2009/0139496 A1* 6/2009 Rea .................... F02M 25/0872 123/520
2009/0223370 A1* 9/2009 Kosugi .............. B01D 53/0407 96/108
2009/0266236 A1* 10/2009 Kosugi .............. B01D 53/0415 96/108
2009/0320806 A1* 12/2009 Lang ..................... H04L 27/361 123/549
2011/0237424 A1* 9/2011 von Blucher ........ B01J 20/2803 502/402
2012/0012474 A1* 1/2012 Yamada ................ F28D 20/023 165/185
2013/0291839 A1* 11/2013 Lin ........................ F02M 33/02 123/518
2014/0096749 A1* 4/2014 Pearce ............... F02M 25/0854 123/519
2014/0124385 A1* 5/2014 Yamasaki .......... B01J 20/28092 502/418
2015/0184621 A1* 7/2015 Arase ................. B01D 53/0407 96/131
2015/0328962 A1* 11/2015 Felber ................ B01D 46/2474 95/286
2016/0146157 A1* 5/2016 Dudar .................. F02M 25/089 123/519
2016/0243524 A1* 8/2016 Mani .................... B01J 20/3042
2016/0271555 A1* 9/2016 Hiltzik ................. F02M 25/089
2016/0319777 A1* 11/2016 Kim ................... B01D 53/0407
2017/0350352 A1* 12/2017 Ishikawa ............... F17C 11/005
2018/0023519 A1* 1/2018 Ratte .................... F02M 25/089 123/519
2018/0163671 A1* 6/2018 Iwamoto ............ B01D 53/0446
2018/0283322 A1* 10/2018 Kuboyama .......... F02M 25/089
2018/0363594 A1* 12/2018 Byrne ................ F02M 25/0854
2019/0249624 A1* 8/2019 Seki ................... B01D 53/0407
2020/0124004 A1* 4/2020 Ajiki .................. F02M 25/0854
2021/0198111 A1 7/2021 Imai et al.
2021/0237030 A1* 8/2021 Seki ..................... B01J 20/3078
2021/0388798 A1* 12/2021 Iwamoto ............ B01D 53/0407
2022/0040627 A1* 2/2022 Seki ......................... B01J 20/20
2022/0252025 A1* 8/2022 Nakagawa ......... F02M 25/0854
2022/0333558 A1* 10/2022 Iwamoto ............ B01D 53/0446
2022/0333559 A1* 10/2022 Iwamoto ............ F02M 25/0872
2024/0068429 A1* 2/2024 Iwamoto ............ F02M 25/0854
2024/0240600 A1* 7/2024 Iwamoto ............ B01D 53/0415

* cited by examiner

CANISTER

CROSS-REFERENCE TO RELATED APPLICATIONS

The present application claims the benefit of Japanese Patent Application No. 2023-115103 filed on Jul. 13, 2023 with the Japan Patent Office, the entire disclosure of which is incorporated herein by reference.

BACKGROUND

The present disclosure relates to a canister.

As disclosed in Japanese Patent No. 7244553, a technique for reducing a ventilation resistance in a canister has been proposed, in which an adsorbent arranged in an adsorption chamber including an atmosphere port open to atmospheric air has a cross section larger than those in other adsorption chambers. The cross section of the adsorbent means a cross section vertical to a flow direction of fuel vapor.

Also, as disclosed in Japanese Patent No. 6568328, use of an activated carbon fiber sheet for a canister in a vehicle has been proposed.

SUMMARY

When used in canisters, an activated carbon fiber sheet may be processed to become an agglomerate having a specific shape. To perform such a processing, the activated carbon fiber sheet needs to have a high density, and consequently may increase a ventilation resistance in a canister. To address it, as disclosed in Japanese Patent No. 7244553, it is conceivable to reduce the ventilation resistance in the canister by increasing a cross-sectional area of the agglomerate. However, even if such a configuration is employed, there are possibilities of failing to sufficiently reduce the ventilation resistance.

In one aspect of the present disclosure, it is desirable to reduce a ventilation resistance in a canister while inhibiting performance of a fuel vapor adsorption from decreasing.

In one aspect of the present disclosure, a canister configured to be mounted in a vehicle with an engine comprises at least one chamber, an inflow port, an atmosphere port, an outflow port, and an adsorbent agglomerate. In the at least one chamber, an adsorbent to adsorb fuel vapor is arranged. The inflow port is configured to allow the fuel vapor to flow into the at least one chamber from a fuel tank of the vehicle. The atmosphere port is configured to be open to an atmospheric air. The outflow port is configured to allow the fuel vapor adsorbed on the adsorbent to flow out to the engine by the atmospheric air flowing in from the atmosphere port. The adsorbent agglomerate is arranged in a specific chamber. The adsorbent agglomerate is a mass of a fibrous adsorbent. The specific chamber is one of the at least one chamber. The adsorbent agglomerate includes, on its outer surface, first and second surfaces intersecting with a flow direction of a fluid in the specific chamber. The second surface is positioned on a side opposite to the first surface. The adsorbent agglomerate includes at least one vacant space formed in the first surface and/or the second surface. The at least one vacant space extends along the flow direction to a bottom located inside the adsorbent agglomerate.

In the above-described configuration, the at least one vacant space is provided in the first surface and/or the second surface of the adsorbent agglomerate and does not penetrate through the adsorbent agglomerate. Thus, it is possible to reduce a ventilation resistance in the canister while inhibiting performance of the fuel vapor adsorption from decreasing.

In one aspect of the present disclosure, the at least one vacant space may be formed throughout the first surface and/or the second surface of the adsorbent agglomerate.

The above-described configuration can reduce the ventilation resistance in the canister while inhibiting an uneven flow of the fuel vapor.

In one aspect of the present disclosure, the at least one vacant space may be formed in the first surface in the adsorbent agglomerate and does not have to be formed in the second surface.

Since the above-described configuration makes it easier to confirm an orientation of the adsorbent agglomerate, an operation to arrange the adsorbent agglomerate in the specific chamber is simpler in a manufacturing process of the canister.

In one aspect of the present disclosure, the at least one chamber may comprise two or more chambers. The two or more chambers may comprise a chamber adjacent to the inflow port and to the outflow port and a chamber adjacent to the atmosphere port. A distance from the first surface to the atmosphere port along the flow direction may be longer than a distance from the second surface to the atmosphere port along the flow direction.

In the above-described configuration, the first surface of the adsorbent agglomerate including the at least one vacant space can be positioned away from the atmosphere port. Thus, the fuel vapor can be inhibited from flowing out to an exterior of the canister through the atmosphere port.

In one aspect of the present disclosure, the at least one vacant space may be formed in the first and second surfaces of the adsorbent agglomerate.

The above-described configuration can reduce the ventilation resistance in the canister.

In one aspect of the present disclosure, the at least one chamber may comprise, as the specific chamber, the chamber adjacent to the atmosphere port.

The above-described configuration can reduce the ventilation resistance in the canister while inhibiting the fuel vapor from flowing out through the atmosphere port.

In one aspect of the present disclosure, the adsorbent agglomerate may comprise, as the at least one vacant space, two or more holes in the first surface and/or the second surface.

The above-described configuration can reduce the ventilation resistance in the canister while inhibiting the performance of the fuel vapor adsorption from decreasing.

In one aspect of the present disclosure, the two or more holes may be arranged throughout the first surface and/or the second surface such that each hole is spaced from another hole adjacent to the hole with a substantially constant spacing.

The above-described configuration can reduce the ventilation resistance in the canister while inhibiting the uneven flow of the fuel vapor.

In one aspect of the present disclosure, the adsorbent agglomerate may comprise a main body extending along an axis, and two or more projections provided on a first end portion and/or a second end portion, along the axis, of the main body. The at least one vacant space in the first surface and/or the second surface of the adsorbent agglomerate may be formed by at least one interspace between the two or more projections provided on the first end portion and/or the second end portion of the main body.

The above-described configuration can reduce the ventilation resistance in the canister while inhibiting the performance of the fuel vapor adsorption from decreasing.

In one aspect of the present disclosure, the two or more projections may each have a shape tapered toward a tip thereof.

The above-described configuration allows the at least one vacant space to be formed by the at least one interspace between the two or more projections in a suitable manner.

BRIEF DESCRIPTION OF THE DRAWINGS

Example embodiments of the present disclosure will be described below with reference to the accompanying drawings, in which.

DETAILED DESCRIPTION OF EXEMPLARY EMBODIMENTS

Embodiments of the present disclosure are not limited to the embodiments below, and may take various forms as long as they belong to the technical scope of the present disclosure.

1. First Embodiment

(1) Configuration of Canister

Figure 1:
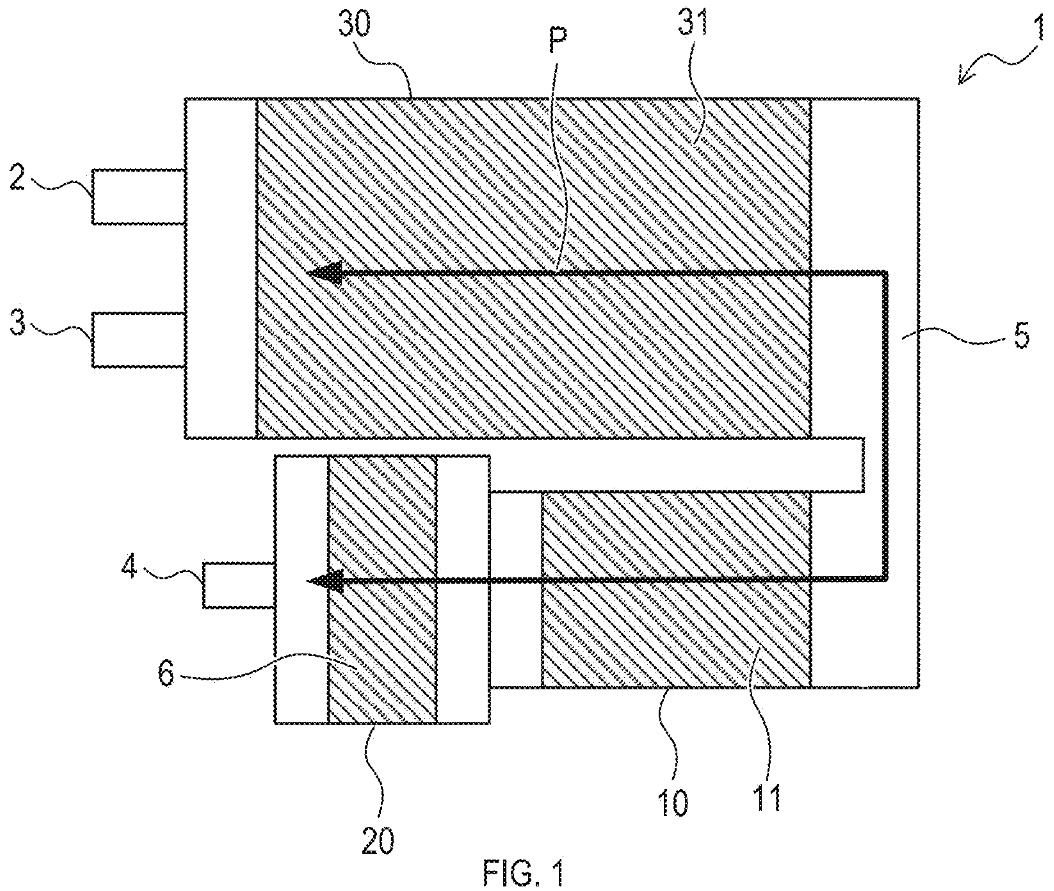
FIG. 1 is a schematic sectional view of a canister according to a first embodiment.

A canister 1 according to a first embodiment is a device that is mounted in a vehicle and that adsorbs and desorbs fuel vapor generated in a fuel tank from which fuel is supplied to an engine of the vehicle (see FIG. 1).

The canister 1 comprises an inflow port 2, an outflow port 3, an atmosphere port 4, a first adsorption chamber 10, a second adsorption chamber 20, a third adsorption chamber 30, and a connection passage 5.

The inflow port 2 is coupled to a fuel tank by a pipe. The inflow port 2 is configured to take the generated fuel vapor from the fuel tank into the canister 1.

The outflow port 3 is coupled to an intake pipe of the engine through a not-shown purge valve. The outflow port 3 is configured to allow the fuel vapor accumulated in each adsorption chamber of the canister 1 to be discharged toward the engine during purging.

The atmosphere port 4 is open to atmospheric air. In other words, the atmosphere port 4 communicates with an outside of the vehicle and is configured to release, to atmospheric air, an air from which the fuel vapor is removed. In addition, the atmosphere port 4 allows an atmospheric air (hereinafter, a purge air) to be taken in during the purging. The purge air flows downstream within the canister 1, thereby removing the fuel vapor adsorbed on an adsorbent of each adsorption chamber within the canister 1, and the removed fuel vapor is discharged through the outflow port 3.

The inflow port 2 and the outflow port 3 are provided at one end of a flow path P for the fuel vapor and the purge air (collectively also referred to as a "fluid") within the canister 1. In contrast, the atmosphere port 4 is provided at the other end of the flow path P opposite to the inflow port 2 and the outflow port 3. A direction of the flow path P corresponds to a flow direction of the fluid within the canister 1.

Inside the canister 1, a second adsorption chamber 20, a first adsorption chamber 10, and a third adsorption chamber 30 are arranged in order from the atmosphere port 4 along the flow path P. The atmosphere port 4 is adjacent to the second adsorption chamber 20. The inflow port 2 and the outflow port 3 are adjacent to the third adsorption chamber 30.

The first adsorption chamber 10 and the second adsorption chamber 20 are aligned in a straight line, and the flow path Pin the first and second adsorption chambers 10 and 20 extends linearly. In contrast, the first adsorption chamber 10 and the third adsorption chamber 30 are arranged to be folded back via a connection passage 5, and the flow path P in the first and third adsorption chambers 10 and 30 is folded back into a U shape. It is noted that the first to third adsorption chambers 10 to 30 are not limited, and the first to third adsorption chambers 10 to 30 may be aligned in a straight line, and the flow path P may extend linearly from end to end.

The third adsorption chamber 30 is a main chamber having a maximum volume among the adsorption chambers. In the third adsorption chamber 30, a third adsorbent 31 to adsorb the fuel vapor is located. Examples of the third adsorbent 31 include activated carbon, more specifically, powdery activated carbon, granular activated carbon, activated carbon having a honeycomb-shape structure, and fibrous activated carbon that formed into a sheet shape, a rectangular prism shape, a circular cylindrical shape, a polygonal column shape, or the like.

In contrast, the first adsorption chamber 10 and the second adsorption chamber 20 are subsidiary chambers each having a smaller volume than the third adsorption chamber 30 serving as a main chamber. Inside the first adsorption chamber 10, a first adsorbent 11 similar to the third adsorbent 31 is arranged. However, the second adsorption chamber 20 is configured as a specific chamber. In the second adsorption chamber 20, a second adsorbent serving as an adsorbent agglomerate 6 is arranged.

(2) Adsorbent Agglomerate

The adsorbent agglomerate 6 is configured to adsorb the fuel vapor. As an example, the adsorbent agglomerate 6 is a felt-like mass of fibrous activated carbon (see FIGS. 1 to 3). The adsorbent agglomerate 6 is formed, as an example, by solidifying fibrous activated carbon with binders or the like. Alternatively, the fibrous activated carbon may be formed, for example, by carbonizing fibrous materials such as non-woven fabric. The adsorbent agglomerate 6 may be also formed by solidifying fibrous adsorbents other than activated carbon.

The adsorbent agglomerate 6 is formed, as an example, into a circular cylindrical shape extending along an axial line A. A length of the adsorbent agglomerate 6 in a direction of the axial line A is shorter than a diameter (i.e., width) of a circular cross section (hereinafter, also simply referred to as a "cross section") orthogonal to the axial line A. It is noted that the axial line A passes through the center of the cross section of the adsorbent agglomerate 6. The shape of the adsorbent agglomerate 6 is not limited to the circular cylindrical shape, and may be, for example, a rectangular column shape having a shorter length in the direction of the axial line A than a width thereof.

The adsorbent agglomerate 6 is arranged in the second adsorption chamber 20 such that the direction of the axial line A coincides with the direction of the flow path P (i.e., a flow direction of the fluid). In addition, the adsorbent agglomerate 6 includes a first surface 60 and a second surface 61, which are formed at both ends on its outer surface of the adsorbent agglomerate 6 in the direction of the axial line A. The first surface 60 and the second surface 61 intersect with the direction of the flow path P, as an example, at an angle of approximately 90°, and the second surface 61 is positioned on a side opposite to the first surface 60.

The second surface 61 is located on a side where the atmosphere port 4 is arranged (i.e., side of the atmosphere port 4) in the flow direction of the fluid, and the first surface 60 is located on a side where the inflow port 2 and the outflow port 3 are arranged (i.e., side of the first adsorption chamber 10). That is, a distance from the first surface 60 to the atmosphere port 4 along the flow direction of the fluid is longer than a distance from the second surface 61 to the atmosphere port 4 along the flow direction of the fluid. In other words, the second surface 61 is located closer to the atmosphere port 4 than the first surface 60 is, and a minimum distance to the port from the first surface 60 is longer than the minimum distance to the port from the second surface 61. The minimum distance to the port means a shorter distance of a distance from the first surface 60 to the atmosphere port 4 along the flow direction of the fluid and a distance from the first surface 60 to the inflow port 2 and the outflow port 3 along the flow direction of the fluid, or of a distance from the second surface 61 to the atmosphere port 4 along the flow direction of the fluid and a distance from the second surface 61 to the inflow port 2 and the outflow port 3 along the flow direction of the fluid.

Figure 2:
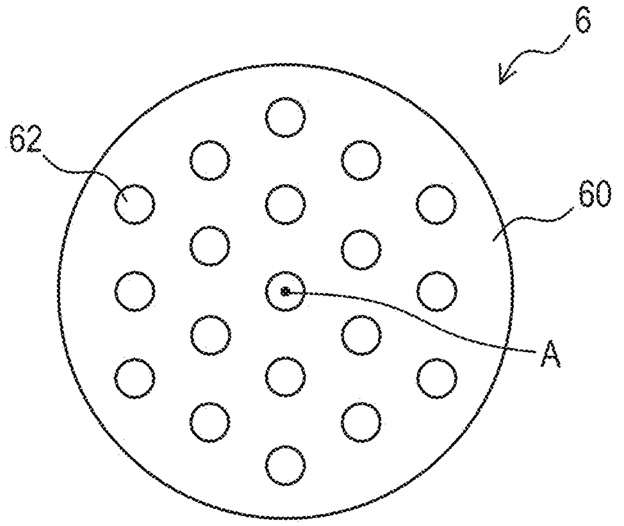
FIG. 2 is a front view of an adsorbent agglomerate according to the first embodiment.
Figure 3:
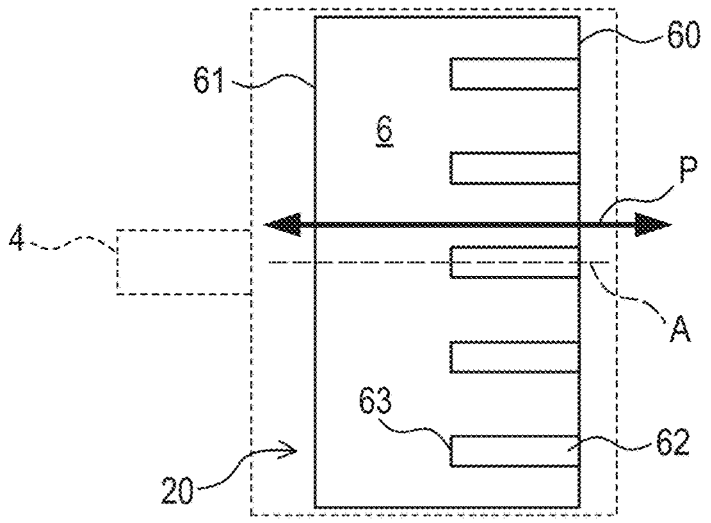
FIG. 3 is a sectional view of the adsorbent agglomerate arranged in a second adsorption chamber according to the first embodiment, illustrating a central axis of the adsorbent agglomerate.

The first surface 60 includes two or more holes 62 (i.e., vacant spaces) each formed to extend in a direction substantially coincident with the direction of the axial line A (i.e., flow direction of the fluid) (see FIGS. 2 and 3). As an example, the holes 62 have depths substantially identical to each other, and have respective bottoms 63. Each bottom 63 is located substantially in a middle of the adsorbent agglomerate 6 in the direction of the axial line A. Each hole 62 does not penetrate through the adsorbent agglomerate 6. In contrast, the second surface 61 does not include a hole.

As an example, each hole 62 has a circular cylindrical shape, but is not limited to this shape. The shape of each hole 62 may be determined as appropriate. The holes 62 have substantially identical diameters (i.e., a dimension of each hole 62) (as an example, an approximately 2 mm diameter) to each other in the respective cross sections.

In addition, as an example, the holes 62 are arranged throughout the first surface 60 such that each hole 62 is spaced from another hole 62 adjacent to the hole 62 with a substantially constant spacing. Preferably, the distance between two adjacent holes 62 is greater than the diameter (i.e., width) of each hole 62.

The holes 62 may be formed, for example, by using a mold in a molding process of the adsorbent agglomerate 6, or by making a hole in the first surface 60 after the adsorbent agglomerate 6 is molded.

(3) Modified Examples of Adsorbent Agglomerate (1) First Modified Example

Figure 4:
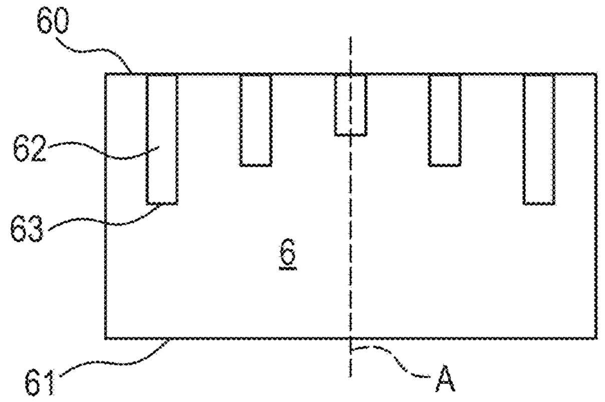
FIG. 4 is a sectional view of an adsorbent agglomerate according to a modified example of the first embodiment, illustrating a central axis of the adsorbent agglomerate.

The holes 62 in the first surface 60 may vary in depth. Specifically, as shown in FIG. 4, the holes 62 may be deeper from the center of the first surface 60 toward its rim. Typically, a flow of fluid concentrates on the center in its flow path, and a flow velocity of fluid decreases toward an edge of the flow path. Thus, by making the holes 62 deeper from the center of the first surface 60 to the rim, a flow of the fluid passing through the adsorbent agglomerate 6 can be encouraged in a suitable manner.

Alternatively, for example, the adsorbent agglomerate 6 may include no hole in the first surface 60, but include the holes 62 in the second surface 61 in a similar manner.

Alternatively, the holes 62 may be formed in each of the first surface 60 and second surface 61 of the adsorbent agglomerate 6, similarly to the embodiment described above.

Figure 5:
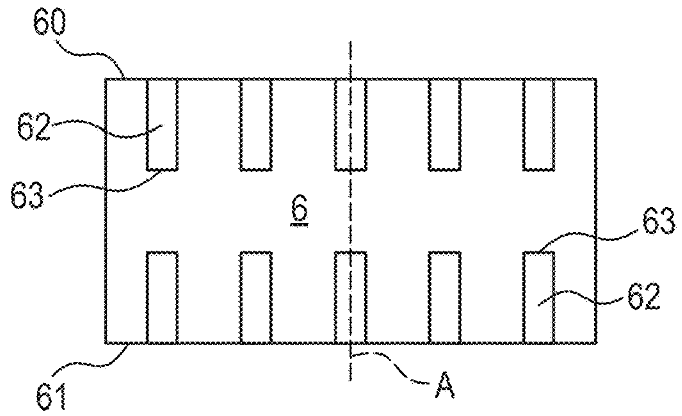
FIG. 5 is a sectional view of an adsorbent agglomerate according to a modified example of the first embodiment, illustrating a central axis of the adsorbent agglomerate.

Specifically, for example, as shown in FIG. 5, the holes 62 in the first surface 60 and the holes 62 in the second surface 61 may be arranged such that the bottom 63 of each hole 62 in the first surface 60 and the bottom 63 of each hole 62 in the second surface 61 face each other in the direction of the axial line A. In other words, when the adsorbent agglomerate 6 is viewed in the direction of the axial line A, the holes 62 in the first surface 60 and the holes 62 in the second surface 61 may be arranged so as to overlap. Accordingly, a ventilation resistance of the adsorbent agglomerate 6 can be reduced.

Figure 6:
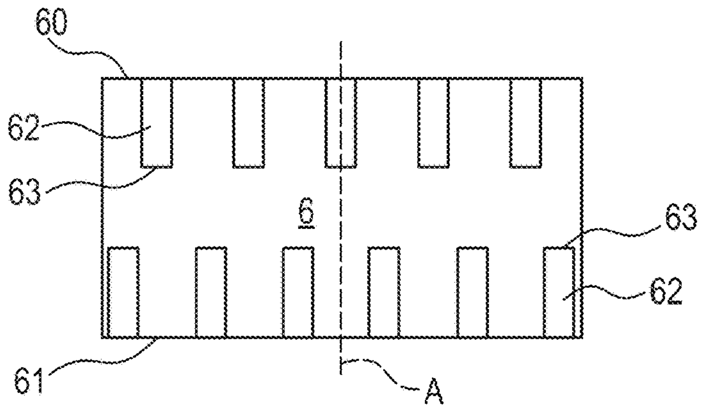
FIG. 6 is a sectional view of an adsorbent agglomerate according to a modified example of the first embodiment, illustrating a central axis of the adsorbent agglomerate.

Alternatively, for example, as shown in FIG. 6, the holes 62 in the first surface 60 and the holes 62 in the second surface 61 may be arranged such that the bottom 63 of each hole 62 in the first surface 60 and the bottom 63 of each hole 62 in the second surface 61 do not face each other in the direction of the axial line A. In other words, when viewed in the direction of the axial line A, the holes 62 in the first surface 60 and the holes 62 in the second surface 61 may be arranged so as not to overlap. Accordingly, it is possible to ensure a distance to allow the fuel vapor to move while in contact with the adsorbent agglomerate 6 when the fuel vapor passes through the adsorbent agglomerate 6, thus encouraging the fuel vapor to be adsorbed into the adsorbent agglomerate 6.

(2) Second Modified Example

The holes 62 may be formed in any specific location on the first surface 60 and/or second surface 61 of the adsorbent agglomerate 6, rather than throughout the first surface 60 and/or second surface 61 of the adsorbent agglomerate 6.

Figure 7:
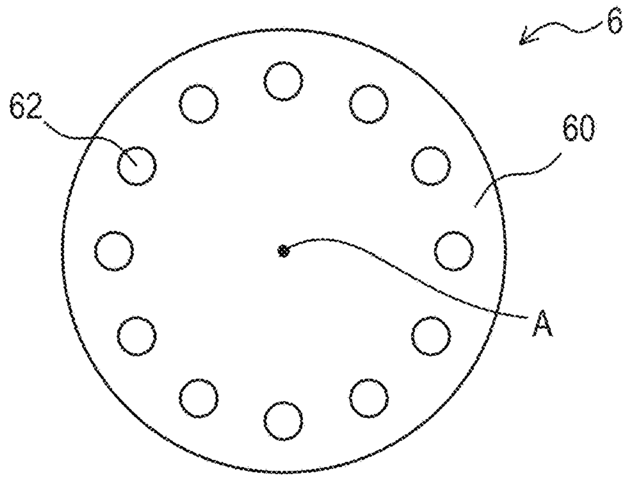
FIG. 7 is a front view of an adsorbent agglomerate according to a modified example of the first embodiment.
Figure 8:
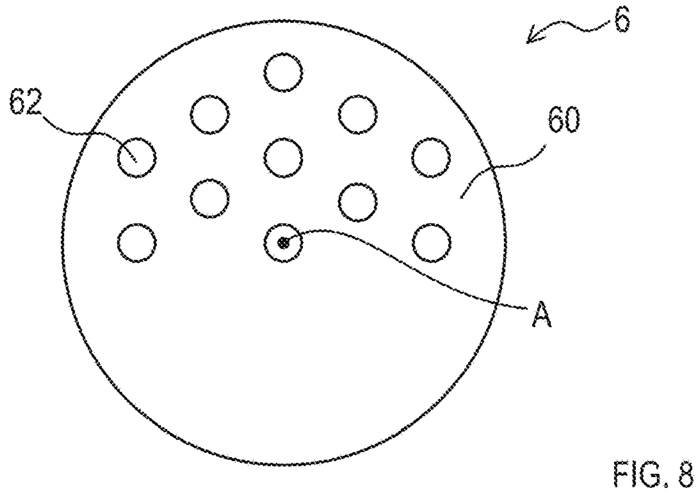
FIG. 8 is a front view of an adsorbent agglomerate according to a modified example of the first embodiment.

Specifically, the holes 62 may be formed in an area, for example, where the flow of the fluid is stagnant. In an example, as shown in FIG. 7, the holes 62 may be arranged along an outer circumference of the first surface 60 in a row so as to be aligned from each other at a substantially constant spacing. Alternatively, for example, as shown in FIG. 8, the first surface 60 may be divided in two semicircular areas, and the holes 62 may be formed throughout one of the two semicircular areas.

Figure 9:
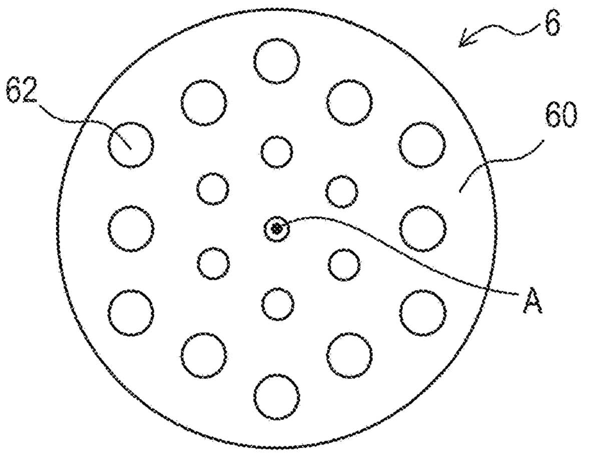
FIG. 9 is a front view of an adsorbent agglomerate according to a modified example of the first embodiment.

Alternatively, the holes 62 formed in the first surface 60 and/or the second surface 61 may vary in diameter (i.e., dimension). Specifically, for example, as shown in FIG. 9, the holes 62 may be enlarged from the center of the first surface 60 toward its outer circumference. As described above, the flow velocity of the fluid decreases toward the edge of the flow path. Thus, by enlarging the holes 62 from the center of the first surface 60 toward its outer circumference, it is possible to encourage the fluid passing through the adsorbent agglomerate 6 to flow in a suitable manner.

Alternatively, one hole 62 may be formed in the first surface 60 and/or the second surface 61.

2. Second Embodiment

(1) Adsorbent Agglomerate

The canister 1 according to a second embodiment differs from that according to the first embodiment in a configuration of an adsorbent agglomerate 7, which is a second adsorbent arranged in the second adsorption chamber 20. The following describes a difference in the configuration of the adsorbent agglomerate 7 from the first embodiment.

Figure 10:
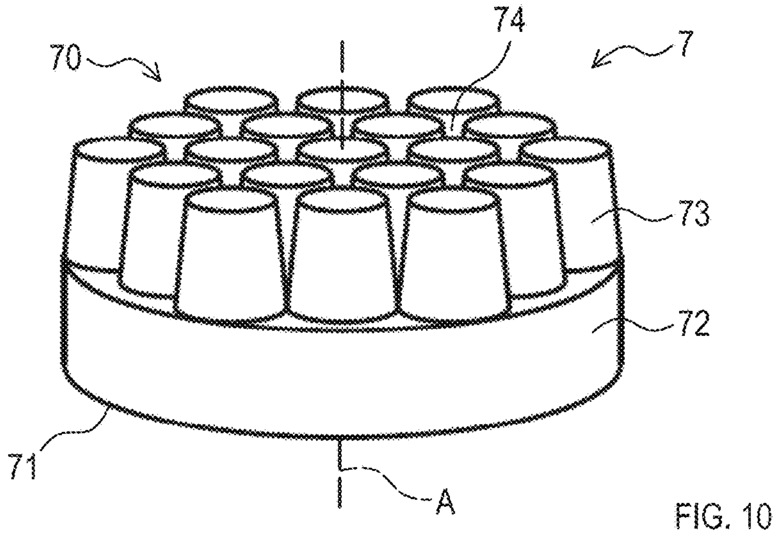
FIG. 10 is a perspective view of an adsorbent agglomerate according to a second embodiment.
Figure 11:
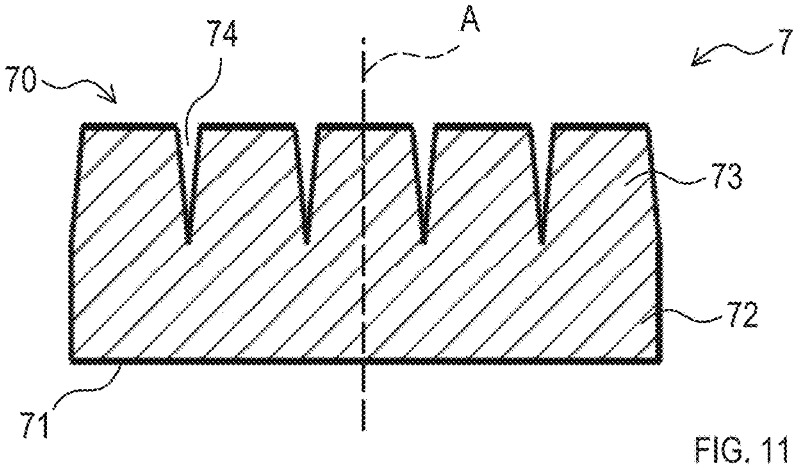
FIG. 11 is a sectional view of the adsorbent agglomerate according to the second embodiment, illustrating a central axis of the adsorbent agglomerate.

The adsorbent agglomerate 7 comprises a main body 72 and two or more first projections 73 (see FIGS. 10 and 11).

The main body 72 has, as an example, a circular cylindrical shape extending along the axial line A, and a length of the main body 72 in the direction of the axial line A is shorter than a diameter of a cross section (i.e., width) of the main body 72. It is noted that the axial line A passes through the center of the cross section of the main body 72. The shape of the main body 72 is not limited to a circular cylindrical shape, and may be a rectangular column shape having a shorter length along the axial line A than its width, for example.

The first projections 73 each are a portion having a circular cylindrical shape and protruding in the direction of the axial line A from an end portion of the main body 72 in the direction of the axial line A. Each first projection 73 has an identical or similar height. The first projections 73 have tips forming a first surface 70 of the adsorbent agglomerate 7. In addition, each first projection 73 is tapered toward its tip, thereby making it easier to detach a mold from the first projections 73 in a molding process of the adsorbent agglomerate 7.

The first projections 73 are provided close to each other. At least one interspace between adjacent first projections 73 forms at least one vacant space 74. The at least one vacant space 74 extends from the first surface 70 in the direction of the axial line A (i.e., flow direction of the fluid) and spreads throughout the first surface 70. The at least one vacant space 74 reaches the main body 72 or a portion in the vicinity of the main body 72 (hereinafter, a bottom of the main body 72). In other words, the bottom of the at least one vacant space 74 corresponds to a portion in the vicinity of base portions of the first projections 73 on the adsorbent agglomerate 7. The interspace between the first projections 73 may form a continuous single vacant space 74, or may form two or more vacant spaces 74 that are separate from each other.

On the other end portion of the main body 72 where the first projections 73 are not formed, a second surface 71 is provided. In other words, the second surface 71 includes no vacant space.

Similarly to the first embodiment, the adsorbent agglomerate 7 is arranged in the second adsorption chamber 20 such that the direction of the axial line A coincides with the flow direction of the fluid. In addition, the second surface 71 is located on the side of the atmosphere port 4 in the flow direction of the fluid, and the first surface 70 is located on the side where the inflow port 2 and the outflow port 3 are arranged (i.e., side of the first adsorption chamber 10). That is, a distance from the first surface 70 to the atmosphere port 4 along the flow direction of the fluid is longer than a distance from the second surface 71 to the atmosphere port 4 along the flow direction. In other words, a minimum distance to the port from the first surface 70 is longer than a minimum distance to the port from the second surface 71.

The first surface 70 of the adsorbent agglomerate 7 may include no vacant space, whereas the second surface 71 may include at least one vacant space by having two or more projections in a similar manner.

(2) Modified Examples

In the adsorbent agglomerate 7 in modified examples, the at least one vacant space 74 is formed in the first surface 70, and the at least one vacant space 76 is formed in the second surface 71 (see FIGS. 12 to 15). Specifically, the adsorbent agglomerate 7 comprises the main body 72, the two or more first projections 73, and two or more second projections 75.

The main body 72 and the first projections 73 are configured similarly to the second embodiment.

In contrast, similarly to the first projections 73, the second projections 75 are provided on an end portion of the main body 72 opposite to the end portion where the first projections 73 are provided. The second surface 71 of the adsorbent agglomerate 7 is formed by tips of the second projections 75. Similarly to the first projections 73, each second projection 75 is tapered toward its tip, and at least one interspace between adjacent second projections 75 forms at least one vacant space 76 throughout the second surface 71.

Figure 12:
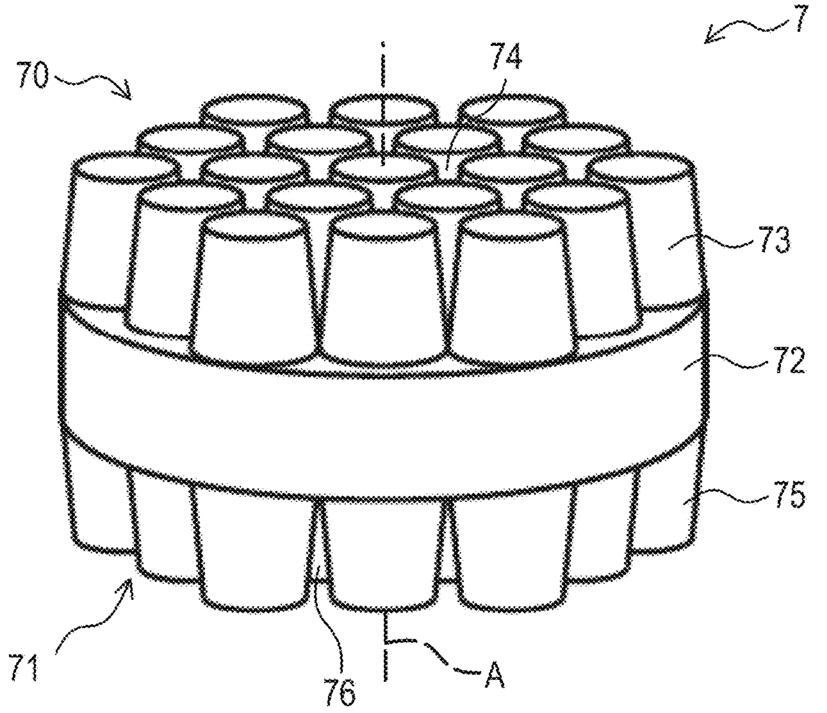
FIG. 12 is a perspective view of an adsorbent agglomerate according to a modified example of the second embodiment.
Figure 13:
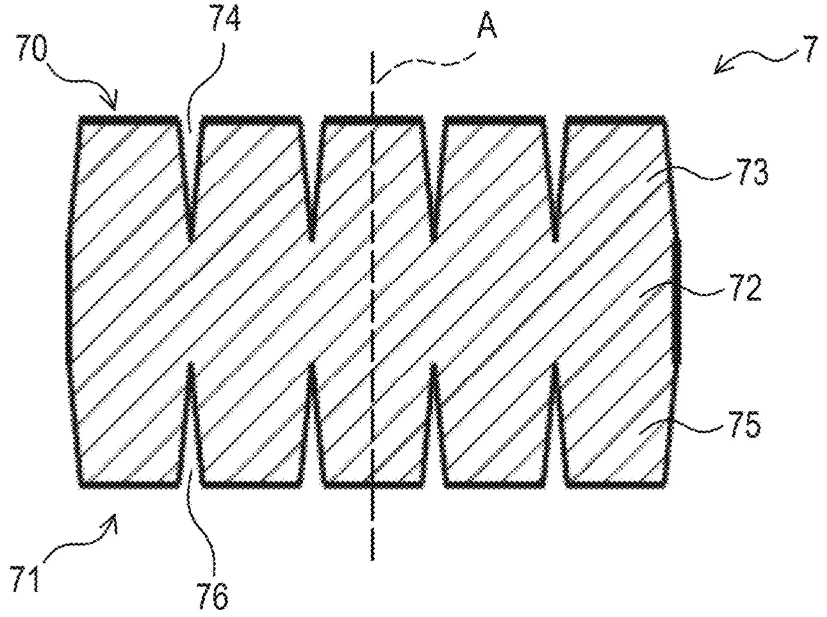
FIG. 13 is a sectional view of the adsorbent agglomerate according to the modified example of the second embodiment, illustrating a central axis of the adsorbent agglomerate.

As shown in FIGS. 12 and 13, each first projection 73 and each second projection 75 may be arranged so as to face each other in the direction of the axial line A, in other words, when the adsorbent agglomerate 7 is viewed in the direction of the axial line A, the first projections 73 and the second projections 75 may be arranged so as to overlap each other. Accordingly, since the bottom of the at least one vacant space 74 on the first surface 70 and the bottom of the at least one vacant space 76 in the second surface 71 are encouraged to overlap in the direction of the axial line A, a ventilation resistance of the adsorbent agglomerate 7 can be reduced.

Figure 14:
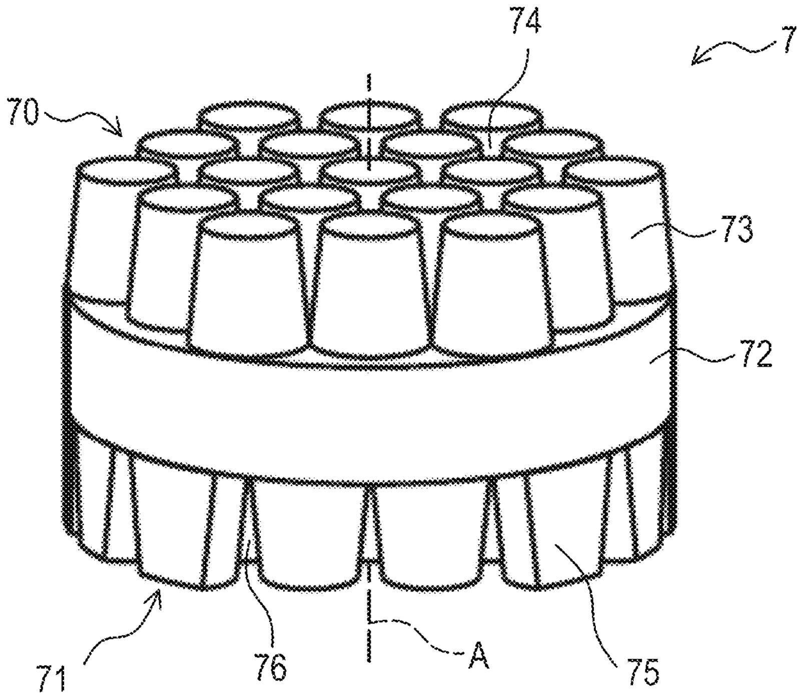
FIG. 14 is a perspective view of an adsorbent agglomerate according to a modified example of the second embodiment.
Figure 15:
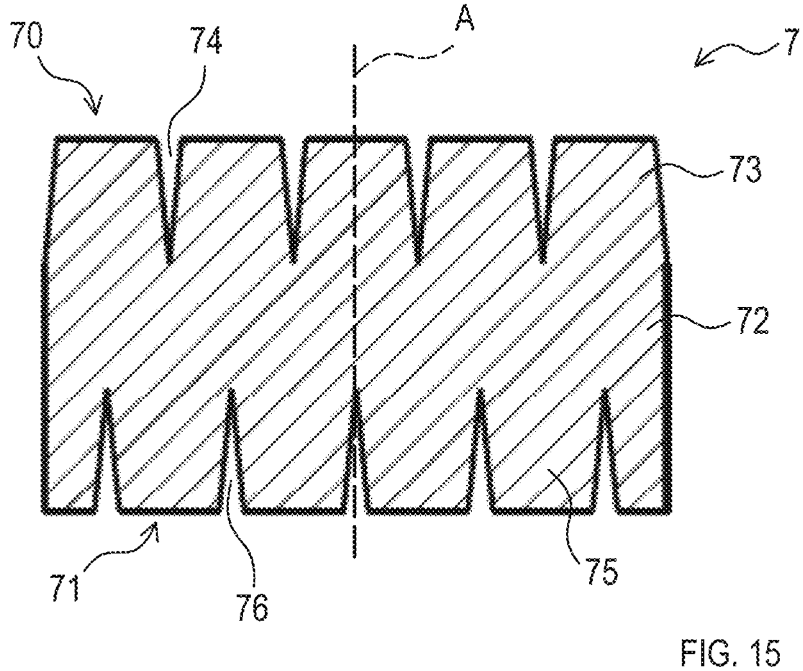
FIG. 15 is a sectional view of the adsorbent agglomerate according to the modified example of the second embodiment, illustrating a central axis of the adsorbent agglomerate.

Alternatively, as shown in FIGS. 14 and 15, each first projection 73 and each second projection 75 may be arranged so as not to face each other in the direction of the axial line A, in other words, when the adsorbent agglomerate 7 is viewed in the direction of the axial line A, the first projections 73 and the second projections 75 may be arranged so as not to overlap each other. The bottom of the at least one vacant space 74 on the first surface 70 and the bottom of the at least one vacant space 76 on the second surface 71 can be inhibited from overlapping in the direction of the axial line A. Accordingly, it is possible to ensure a distance to allow the fuel vapor to move while in contact with the adsorbent agglomerate 7 when the fuel vapor passes through the adsorbent agglomerate 7, thus encouraging the fuel vapor to be adsorbed into the adsorbent agglomerate 7.

3. Effects (1) In the aforementioned embodiments, the at least one vacant space is provided in the first surface and/or the second surface of the adsorbent agglomerate. Since the at least one vacant space does not to penetrate through the adsorbent agglomerate, the fluid that has entered the second adsorption chamber 20 is encouraged to pass through the adsorbent agglomerate. Thus, it is possible to reduce a ventilation resistance in the canister 1 while inhibiting performance of the fuel vapor adsorption from decreasing.

(2) The at least one vacant space is formed throughout the first surface and/or second surface of the adsorbent agglomerate. Thus, it is possible to decrease the ventilation resistance in the canister while inhibiting an uneven flow of the fuel vapor.

(3) By forming the at least one vacant space in only the first surface of the adsorbent agglomerate, it is easier to confirm an orientation of the adsorbent agglomerate. Thus, an operation to arrange the adsorbent agglomerate in the second adsorption chamber 20 is simpler in a manufacturing process of the canister 1.

(4) The first surface of the adsorbent agglomerate including the at least one vacant space is arranged on the side of the first adsorption chamber 10, and the second surfaces of the adsorbent agglomerate is arranged on the side of the atmosphere port 4. Thus, the fuel vapor can be inhibited from flowing out to an exterior of the canister 1 through the atmosphere port 4.

(5) It is possible to further reduce the ventilation resistance in the canister by providing the at least one vacant space in each of the first and second surfaces of the adsorbent agglomerate.

(6) The adsorbent agglomerate can be arranged in the second adsorption chamber 20 adjacent to the atmosphere port 4. Thus, it is possible to reduce the ventilation resistance in the canister 1 while inhibiting the fuel vapor from flowing out through the atmosphere port 4.

4. Other Embodiments (1) In the aforementioned embodiments, the adsorbent agglomerate is arranged in the second adsorption chamber 20. However, the adsorbent agglomerate may be arranged in the first adsorption chamber 10 or the third adsorption chamber 30 such that the direction of the axial line A and the direction of the flow path P substantially coincide with each other. In this case, the adsorbent agglomerate may be formed into a shape corresponding to the first adsorption chamber 10 or to the third adsorption chamber 30, and may be arranged throughout the first adsorption chamber 10 or the third adsorption chamber 30, or may be arranged in a partial region of either the first adsorption chamber 10 or the third adsorption chamber 30.

In this case, as an example, the adsorbent agglomerate including the at least one vacant space (i.e., at least one hole) only in the first surface may be arranged in the first adsorption chamber 10 such that the second surface is located on the side of the atmosphere port 4. As an example, the adsorbent agglomerate may be arranged in the third adsorption chamber 30 such that the second surface is located on the side of the inflow port 2 and the outflow port 3.

(2) In the aforementioned embodiments, the direction of the axial line A of the adsorbent agglomerate arranged in the second adsorption chamber 20 is substantially coincident with an alignment direction where the first and second adsorption chambers 10 and 20 are aligned, in other words, the direction of the flow path P in the first adsorption chamber 10 (see FIG. 1). Since the adsorbent agglomerate has a laterally long shape, the second adsorption chamber 20 protrudes more laterally than the first adsorption chamber 10.

However, the adsorbent agglomerate may be arranged in the second adsorption chamber 20 such that the orientation of the axial line A intersects with the alignment direction of the first and second adsorption chambers 10 and 20 at a specific angle (as an example, an angle of 90°). The direction of the flow path P within the second adsorption chamber 20 may be adjusted as appropriate such that the direction of the axial line A and the direction of a segment of the flow path P in the adsorbent agglomerate through which the fluid passes are substantially coincident. The second adsorption chamber 20 can be inhibited from protruding laterally, and mountability of the canister 1 to a vehicle can be improved.

(3) Although the canister 1 of the aforementioned embodiments comprises the three adsorption chambers 10 to 30, the number of adsorption chambers to be provided in the canister 1 may be one or two, or four or more. Even in such a case, similarly to the aforementioned embodiments, the adsorbent agglomerate may be arranged in any of the adsorption chambers. The adsorbent agglomerates may be arranged in two or more adsorption chambers within the canister 1.

(4) Two or more functions of a single element in the above-described embodiments may be performed by two or more elements, and a single function of a single element may be performed by two or more elements. Two or more functions performed by two or more elements may be performed by a single element, and a single function performed by two or more elements may be performed by a single element. Part of the configuration in the above-described embodiments may be omitted. At least a part of the configuration in the above-described embodiments may be added to or be replaced with another configuration in the above-described embodiments.

5. Technical Ideas Disclosed in the Specification

[Item 1]

A canister configured to be mounted in a vehicle with an engine, the canister comprising:

at least one chamber in which an adsorbent to adsorb fuel vapor is arranged;

an inflow port configured to allow the fuel vapor to flow into the at least one chamber from a fuel tank of the vehicle;

an atmosphere port configured to be open to an atmospheric air;

an outflow port configured to allow the fuel vapor adsorbed on the adsorbent to flow out to the engine by the atmospheric air flowing in from the atmosphere port; and an adsorbent agglomerate arranged in a specific chamber, the adsorbent agglomerate being a mass of a fibrous adsorbent, the specific chamber being one of the at least one chamber, the adsorbent agglomerate including, on its outer surface, first and second surfaces intersecting with a flow direction of a fluid in the specific chamber, the second surface being positioned on a side opposite to the first surface, and the adsorbent agglomerate including at least one vacant space formed in the first surface and/or the second surface, the at least one vacant space extending along the flow direction to a bottom located inside the adsorbent agglomerate.

[Item 2]

The canister according to Item 1, wherein the at least one vacant space is formed throughout the first surface and/or the second surface of the adsorbent agglomerate.

[Item 3]

The canister according to Item 1 or Item 2, wherein the at least one vacant space is formed in the first surface of the adsorbent agglomerate and is not formed in the second surface of the adsorbent agglomerate.

[Item 4]

The canister according to Item 3, wherein the at least one chamber comprises a plurality of chambers including:

a chamber adjacent to the inflow port and to the outflow port; and a chamber adjacent to the atmosphere port, and wherein a distance from the first surface to the atmosphere port along the flow direction is longer than a distance from the second surface to the atmosphere port along the flow direction.

[Item 5]

The canister according to Item 1 or Item 2, wherein the at least one vacant space is formed in the first and second surfaces of the adsorbent agglomerate.

[Item 6]

The canister according to any one of Item 1 through Item 5, wherein the at least one chamber comprises, as the specific chamber, the chamber adjacent to the atmosphere port.

What is claimed is:

1. A canister configured to be mounted in a vehicle with an engine, the canister comprising:

two or more chambers in which an adsorbent to adsorb fuel vapor is arranged;

an inflow port configured to allow the fuel vapor to flow into the two or more chambers from a fuel tank of the vehicle;

an atmosphere port configured to be open to an atmospheric air;

an outflow port configured to allow the fuel vapor adsorbed on the adsorbent to flow out to the engine by the atmospheric air flowing in from the atmosphere port; and the adsorbent comprising an adsorbent agglomerate arranged in one chamber of the two or more chambers, the adsorbent agglomerate formed as a mass of a fibrous member, the adsorbent agglomerate including, on its outer surface, first and second surfaces intersecting with a flow direction of a fluid, the second surface being positioned on a side opposite to the first surface, the first surface of the adsorbent agglomerate including at least one vacant space, the at least one vacant space extending along the flow direction to a bottom located inside the adsorbent agglomerate, and the second surface of the adsorbent agglomerate being devoid of a vacant space, a chamber of the two or more chambers being adjacent to the inflow port and to the outflow port;

an other chamber of the two or more chambers being adjacent to the atmosphere port; and a distance from the first surface to the atmosphere port along the flow direction being longer than a distance from the second surface to the atmosphere port along the flow direction.

2. The canister according to claim 1, wherein the at least one vacant space is formed throughout the first surface of the adsorbent agglomerate.

3. The canister according to claim 1, wherein the adsorbent agglomerate is located in the other chamber adjacent to the atmosphere port.

4. The canister according to claim 1, wherein the first surface of the adsorbent agglomerate comprises, as the at least one vacant space, two or more holes.

5. The canister according to claim 4, wherein the two or more holes are arranged throughout the first surface such that each hole is spaced from another hole adjacent to the hole with a substantially constant spacing.

6. The canister according to claim 1, wherein the adsorbent agglomerate comprises:

a main body extending along an axis; and two or more projections provided on a first end portion, along the axis, of the main body;

wherein the at least one vacant space in the first surface of the adsorbent agglomerate is formed by at least one interspace between the two or more projections provided on the first end portion of the main body.

7. The canister according to claim 6, wherein the two or more projections each have a shape tapered toward a tip thereof.

8. A canister configured to be mounted in a vehicle with an engine, the canister comprising:

at least one chamber in which an adsorbent to adsorb fuel vapor is arranged;

an inflow port configured to allow the fuel vapor to flow into the at least one chamber from a fuel tank of the vehicle;

an atmosphere port configured to be open to an atmospheric air;

an outflow port configured to allow the fuel vapor adsorbed on the adsorbent to flow out to the engine by the atmospheric air flowing in from the atmosphere port; and the adsorbent being an adsorbent agglomerate arranged in a specific chamber of the at least one chamber, the adsorbent agglomerate formed as an adsorbent formed as a mass of a fibrous member, the adsorbent agglomerate including, on its outer surface, first and second surfaces intersecting with a flow direction of a fluid in the specific chamber, the second surface being positioned on a side opposite to the first surface, the adsorbent agglomerate including at least one vacant space in the first surface and/or the second surface, the at least one vacant space extending along the flow direction to a bottom located inside the adsorbent agglomerate, the adsorbent agglomerate comprising:

a main body extending along an axis; and two or more projections provided on a first end portion and/or a second end portion, along the axis, of the main body, the at least one vacant space in the first surface and/or the second surface of the adsorbent agglomerate being formed by at least one interspace between the two or more projections provided on the first end portion and/or the second end portion of the main body, and the two or more projections each having a shape tapered toward a tip thereof.

9. The canister according to claim 8, wherein the at least one vacant space is formed throughout the first surface and/or the second surface of the adsorbent agglomerate.

10. The canister according to claim 8, wherein the at least one vacant space is formed in the first surface of the adsorbent agglomerate and is absent from the second surface of the adsorbent agglomerate.

11. The canister according to claim 8, wherein the at least one vacant space is formed in the first and second surfaces of the adsorbent agglomerate.

12. The canister according to claim 8, wherein the at least one chamber comprises, as the specific chamber, a chamber adjacent to the atmosphere port.

* * * * *